United States Patent [19]
Bodle

[11] Patent Number: 5,961,072
[45] Date of Patent: Oct. 5, 1999

[54] EMERGENCY LIGHTING

[75] Inventor: Peter Winstanley Bodle, Norfolk, United Kingdom

[73] Assignee: Saf-T-Glo Limited, Narborough, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/519,426

[22] Filed: Aug. 25, 1995

[30]     Foreign Application Priority Data

Apr. 20, 1995 [GB] United Kingdom ................... 9508065

[51] Int. Cl.$^6$ .............................. B64D 11/00; F21K 2/00
[52] U.S. Cl. ........................... 244/118.5; 40/542; 40/570; 362/84; 362/153
[58] Field of Search ............................... 52/174, 177, 33; 40/542, 570; 362/153, 84; 116/205, DIG. 16; 404/9, 14, 15, 16; 244/118.5, 118.6

[56]             References Cited

U.S. PATENT DOCUMENTS

| | | | |
|---|---|---|---|
| 1,860,685 | 5/1932 | Morris | 40/217 X |
| 2,341,583 | 2/1944 | Tuve | 40/542 X |
| 2,654,971 | 10/1953 | Harrison | 40/542 |
| 2,709,863 | 6/1955 | Bevacqua | 40/206 |
| 2,949,303 | 8/1960 | Sherman | 362/153 X |
| 3,408,025 | 10/1968 | Davis | 52/174 X |
| 3,591,942 | 7/1971 | Van Swearingen | 40/542 X |
| 3,936,207 | 2/1976 | Sticha | 404/14 |
| 4,347,499 | 8/1982 | Burkman, Sr. et al. | 362/153 X |
| 4,385,586 | 5/1983 | Schriever | 52/174 X |
| 4,401,050 | 8/1983 | Britt et al. | 40/542 X |
| 4,794,373 | 12/1988 | Harrison | 362/153 X |
| 5,270,100 | 12/1993 | Giglio | 40/542 |
| 5,279,058 | 1/1994 | Kohn | 40/638 |
| 5,331,918 | 7/1994 | Honigsbaum | 116/205 |
| 5,376,303 | 12/1994 | Royce et al. | 252/301.4 R |
| 5,411,784 | 5/1995 | Brewster | 40/594 X |
| 5,499,170 | 3/1996 | Gagne | 362/153 X |
| 5,686,022 | 11/1997 | Murayama et al. | 252/351.4 R |
| 5,724,909 | 3/1998 | Pitman et al. | 116/202 |
| 5,775,016 | 7/1998 | Chien | 40/544 |
| 5,853,614 | 12/1998 | Hao et al. | 252/301.4 R |

FOREIGN PATENT DOCUMENTS

| | | |
|---|---|---|
| A 0 489 561 | 6/1992 | European Pat. Off. . |
| A 964348 | 8/1950 | France . |
| A 2308155 | 11/1976 | France . |
| 2224154 | 4/1990 | United Kingdom ................... 116/205 |
| WO A 87/02813 | 5/1987 | WIPO . |
| WO A 93/14422 | 7/1993 | WIPO . |
| WO A 94/16287 | 7/1994 | WIPO . |
| WO A 94/17766 | 8/1994 | WIPO . |

*Primary Examiner*—Terry Lee Melius
*Assistant Examiner*—Andrea Chop
*Attorney, Agent, or Firm*—Ronald M. Anderson

[57]             ABSTRACT

An emergency lighting system for an aircraft has photoluminescent strips mounted on the floor rather than a string of electrical lights. This is a better fail-safe since there is no possibility of a failure in power supply. A channel extrusion is secured to the floor of the aircraft and a photoluminescent strip is held between the channel and a transparent cover member. The photoluminescent strip has two thin layers of photoluminescent material rather on a base layer, rather than being a calendered product. This increases the light output.

29 Claims, 4 Drawing Sheets

EMERGENCY LIGHTING

This invention relates to emergency lighting, typically for the interior of vehicles, and especially, but not exclusively, to emergency exit floor path lighting for aircraft.

It is well known in aircraft to have strips of electrical lights mounted at floor level to guide passengers to the emergency exit doors of the aircraft. The strips of electric lights are powered by an emergency battery. Such systems work well, but they have some problems.

One problem is that they need regular servicing. The electrics needs checking periodically and bulbs need replacing. Maintenance of the floor-level emergency exit lights adds significantly to the cost of maintaining an aircraft. Also the power drain caused by running the lights adds to fuel costs.

A further problem is that if the emergency battery fails there is no guide lighting for the passengers leading them to the exits.

Another problem is that in the event of a crash the electrical wires connecting some or all of the floor level emergency lights can be broken, again meaning that some or all of the floor-level emergency lights are inoperative at just the time that they are most needed.

It is an aim of one embodiment of the present invention to alleviate at least some of these problems.

According to a first aspect of the invention we provide an emergency exit path lighting system comprising photoluminescent guide means adapted to indicate to a user a path for movement by emitting light photoluminescently.

Thus there is no external power supply to fail and thus the system may be fail safe. The system requires little or no special maintenance, and may simply require wiping or other similar cleaning. The system may be significantly lighter, cheaper and simpler to install than previous systems.

Preferably the guide means is on the floor, but may be elsewhere (eg on the side of seats).

Preferably the guide means is an elongate member.

Preferably the guide means comprises at least one, and preferably two elongate photoluminescent tracks mounted on or near the floor. The two photoluminescent tracks are preferably spaced apart so as to define a path within which the user should move. Each track preferably comprises a substantially continuous, or effectively continuous, strip of photoluminescent material. Alternatively a guide track may have photoluminescent regions, and non-photoluminescent regions which alternate. In a further alternative the photoluminescent track may comprise a row of photoluminescent dots, circles or the like.

Preferably the substantially continuous track provides a substantially continuous path of light from any point to an emergency exit. An advantage of this is that a person will never be lost as they will always have a path, to an exit, to follow. This "continuous cuing" concept is applicable to other situations.

Alternatively the substantially continuous track may provide a substantially continuous path of light from any point to the region of the emergency exit and electrical lighting means may provide lighting in the region of the emergency exit.

Preferably the system has a track which has a transparent or translucent cover which overlays a photoluminescent guide member. The photoluminescent guide member is preferably a relatively thin strip of material that is supported on a support member. The track may comprise a base member adapted to be secured to the floor, a cover member adapted to be releasably secured to the base member, and a photoluminescent member adapted to be sandwiched between the base member and the cover member. Preferably the photoluminescent member is a flexible strip. In one embodiment the support member supports the photoluminescent strip so that it can withstand being trodden upon. The support member preferably extends across substantially the full width of the photoluminescent strip. The photoluminescent member is preferably removable from the track and is replaceable. A track may be made of adjacent discrete lengths of profiled extrusion. The photoluminescent strip may also be provided in discrete lengths.

Alternatively the photoluminescent strip may be permanently secured, for example with glue, to either, the cover or the support member. In a further embodiment the photoluminescent strip may be co-extruded with either, or both, the cover, or the support member.

The cover member may have a ramped, or sloping, upper surface to facilitate the passage of wheeled vehicles such as trolleys.

Alternatively the cover member may have a low profile so that it provides only a minimal obstruction for wheeled vehicles, such as trolleys.

Preferably the track is laid in short sections. This has several advantages over using a continuous run of track. One advantage is that short runs are not as awkward to handle, another is that they are more resilient in the event of a crash of the vehicle in which the tracks are mounted. A continuous run may tend to be dragged away from the body of the vehicle in such a crash.

Alternatively the track may be laid in a continuous section.

Preferably the cover member of one section may overlap the base member of a neighbouring section. An advantage of this is that neighbouring sections are loosely coupled. A clip may be provided over the joints between the sections of the covering members. Alternatively the sections of the covering members may have no clip and simply butt against a neighbouring section.

Preferably at each end of the track run there are provided end caps. The end caps may be used between the short sections of track.

Preferably to form angled joints the tracks are laid against each other. The sections may be mitred to form an angled joint.

Preferably a layer which is impervious to UV light is used to protect the photoluminescent layer. The UV protecting layer may be a strip mounted on top of the photoluminescent strip or may be a coating on the photoluminescent strip. An advantage of this is that UV light is prevented from reaching the photoluminescent strip, and thus the photoluminescent strip is not degraded by UV light. Also such a layer might additionally, or alternatively, prevent UV light from being emitted from the photoluminescent layer.

Preferably the layer impervious to UV light is made from a PVC based material or resin, but may be from any other suitable material. Preferably the layer impervious to UV light is translucent to light, or other electromagnetic radiation, other than UV light.

The transparent or translucent cover may have portions which are stained, painted, dyed or otherwise modified to change the light transmission properties of the cover. Preferably these portions are opaque. An advantage of such opaque portions is that they can be used to cover or mask poor cutting of the carpet. Alternatively the portions may not be opaque and may be used to change the color of the light emitted from the photoluminescent strip. The method of modifying the light transmission properties may include inserting a colored filter underneath the cover or may include using a UV protective layer which modifies the color of the light passing through it.

According to a second aspect of the invention we provide a photoluminescent member comprising a base and a layer of photoluminescent material.

The layer may be cast onto the base. Alternatively, we may calender a thin layer, and apply that to the base.

Previously photoluminescent members have been made by mixing photoluminescent material with structural material and producing a calendered product. This has the photoluminescent material spread out throughout the depth of the member, when it is only needed at the surface. We have appreciated that by casting a photoluminescent layer on top of a base (or by having a thin calendered layer on top of a base) we can achieve better results.

Furthermore, we preferably provide (eg cast) two layers, or more, of photoluminescent material onto a base. This has been found to increase the light emitted, and is easier and cheaper than casting one thick layer. We can control the application of a thin layer better than the application of a thick layer, and so would prefer to provide (eg cast) a plurality of thin layers until we have the thickness (or light-emitting properties) we want.

The photoluminescent layer, or layers, is preferably a vinyl layer. The base preferably contains titanium dioxide but may contain other whitening agents. This is believed to capture light to energise the photoluminescent material.

The layers may be co-extruded instead of being cast together. We may co-extrude a base and a photoluminescent layer.

According to a third aspect of the invention we provide a method of manufacturing a photoluminescent article comprising applying (eg casting) a photoluminescent layer onto a base.

According to a fourth aspect of the invention we provide an aircraft having an emergency exit floor path lighting system in accordance with the first aspect of the invention.

Preferably the aircraft has a substantially continuous track mounted on or at the floor, the track comprising the photoluminescent guide means. Alternatively the photoluminescent guide means may be provided on the seats of the aircraft.

Preferably there is one track to one side of an aisle, for example an aisle between seats, and another track to the other side of the aisle. This doubles the light output in a very simple manner and defines a path in which the user may move. Alternatively only a single track may be provided.

Preferably there is one, or most preferably a pair, of branch tracks leading from an aisle track to an emergency door. Most preferably the emergency door, or the region of the doorway, is also marked (preferably bounded) by photoluminescent areas. Alternatively there may be no tracking in the region of the emergency door. The guide means in the region of the emergency door may comprise an electrical or other guide means.

The photoluminescent floor-level emergency exit lighting system may be provided as original equipment, or it may be retrofitted to existing aircraft.

According to a fifth aspect of the invention we provide a method of reducing the cost of maintaining an aircraft's emergency exit floor path lighting system comprising having a photoluminescent emergency exit floor path lighting system instead of an electrically powered system.

Thus the maintenance required may simply be cleaning.

According to a sixth aspect of the invention we provide a method of reducing the cost of maintaining an aircraft's emergency exit floor path lighting system comprising removing an existing electrically powered floor path system and replacing it with a photoluminescent system.

Preferably when the electrical system comprises a line of lights in a channel track we remove the lights, introduce a support member into the channel, and introduce a photoluminescent strip on top of the support member. Preferably a cover is applied over the strip and is secured to the existing channel track.

The photoluminescent strip may be attached to the carpet of the aircraft. Preferably the photoluminescent strip is attached to the carpet using ultrasonic welding, but may be attached using gluing or other method.

Preferably the photoluminescent strip is covered in a protective see-through material. Preferably the protective material is poly-carbonate, but may be any other suitable see through material, as appreciated by a man skilled in the art.

According to a seventh aspect of the invention we provide a method of reducing the cost of installing, or modifying the layout of, an aircraft's emergency exit floor path lighting system comprising securing the aircraft's emergency floor lighting system to the floor of the aircraft through the carpet on the floor (instead of cutting the carpet around the lighting).

This reduces the amount of cutting of the carpet that is required to match it to the floor path lighting system, which makes it quicker and cheaper to install the carpet. It also means that if the layout of the floor path lighting is changed the existing carpet can still be retained since it does not have great big holes in it at the old location of the lighting system.

It will be appreciated that the carpet extends under the floor path lighting system.

Preferably a backing member (eg a strip or plate) is secured to the floor of the aircraft where the lighting is to be positioned.

Preferably the carpet is laid on top of the backing member.

Preferably locating means is provided on the backing member to locate the lighting. The locating means may be holes or studs which co-operate with studs or holes, respectively, on the lighting.

Such a system has an advantage that cutting of the covering carpet is reduced, resulting in a lower wastage of the carpet, and making it quicker to replace the carpet, and thus the cost of refitting the aircraft is reduced.

The lighting may be provided with a means to temporarily attach it to the floor of the aircraft. The means may comprise velcro® (or the like) attached to the lighting strip or may comprise clamps secured at intervals to the cabin floor through holes in the carpet.

According to another aspect of the invention we provide a way of reducing the cost of fitting out an aircraft with floor-mounted emergency exit path lighting system comprising attaching the exit path lighting above the carpet of the aircraft. This may be achieved by studs entering through the carpet, or by velcro®, or in any other way.

The aircraft's emergency exit floor path lighting system may be of the known electrical system or alternatively the emergency exit floor path lighting system may be of the photoluminescent type disclosed in this application.

In any of the inventions disclosed it will be appreciated that the photoluminescent strips may be substantially continuous elongate lines, or they may be interrupted. Or circles or discs of photoluminescent material spaced at intervals may be used as an alternative to strips of photoluminescent material.

We have also made an interesting discovery which is useful in photoluminescent emergency exit pathways, and more widely in photoluminescent signs or displays generally. Up until now if we wanted to have an arrow, or the word EXIT or other words or pictograms, in a photoluminescent sign, or in the exit path line, we can do it by applying an opaque layer above the photoluminescent material, masking out the emitted light. This leaves essentially black markings on a light-emitting background (or vice-versa—we can blank out the background and let the markings glow in the dark).

We have now discovered that some dyes/stains/inks can, when applied over a photoluminescent layer, glow in the dark with a different color to that of the photoluminescent layer. Thus the sign can have both the background and the markings emitting light. This makes the markings easier to see, and means that more light, overall, is given off by the sign.

According to an eighth aspect of the invention we provide a photoluminescent sign or display comprising a photoluminescent layer of a first color, and markings of a second color overlying the photoluminescent layer, the markings being made with a dye or ink (or the like) that, in use, when overlaid, glows in the dark with a different color from that of the photoluminescent layer.

The color that the markings emit in the dark may not be the same color as they reflect in daylight.

The dye or ink may simply filter out some wavelengths of light emitted by the photoluminescent layer, allowing others to pass. Alternatively the dye or ink may be excited by the light emitted by the underlying photoluminescent material and may emit its own light as a response to that excitation.

The dye or ink may itself be photoluminescent with a different color light from that of the layer beneath it.

Preferably the base photoluminescent layer is yellow more specifically yellow/green. Preferably the pigment has a red color but may be another color. The pigment may be a dye, such as POLYVIN MATT FLUORESCENT RED PM 1256 which can be obtained from GIBBON inks and coatings of 25 Deer Park Road, Wimbledon.

The pigment may have incorporated in it a compound which is impervious to UV light. Blocking UV light may have the advantages disclosed hereinbefore.

According to a ninth aspect of the invention we provide a photoluminescent sign or markings having a photoluminescent layer and a dye, or other coloring, overlaid above the photoluminescent layer, the dye being such that photoluminescent light is transmitted through it, but with a changed wavelength spectrum to give a photoluminescent light of a different color to that of the photoluminescent layer.

Instead of transmitting some wavelengths of light emitted by the photoluminescent layer the dye could emit light of its own.

Preferably the sign or markings has a first region in which the photoluminescent layer is overlaid by the dye which modifies the light emitted to produce light of a different color, and a second region in which the photoluminescent layer is not covered by the dye and emits light of its natural color.

There may be more than one layer of photoluminescent material provided with the dye, or other coloring, being provided between the different photoluminescent layers. An advantage of this is that the intensity of the light is increased but a different color portion is still provided.

Preferably the first or second regions define letters, or a word, or an information—giving graphic symbol.

The dye, or other coloring, may contain mixed Xylenes, 2-Butoxyethanol and Cyolohexanone as active ingredients.

The active ingredients may be provided in the proportions Xylenes <10%, 2-Butoxyethanol <5% and Cyolohexanone <15%.

According to a tenth aspect of the invention we provide a photoluminescent material or member which is also reflective.

Preferably the material or member is retro reflective.

The member or material may be provided in the form of a sheet of material.

Preferably a layer of reflective material is provided on top of a layer of photoluminescent material. An advantage of such a composite is that it will act as a light source and also reflect light, making it highly visible. Such a material may have uses in high visibility clothing, life boats, life belts, guidance out of buildings as well as for the emergency floor lighting of vehicles. Such items incorporating this material are explicitly disclosed and we may seek protection for the items per se.

Preferably the layer of reflective material is transparent in addition to being reflective. This may allow light emitted from the photoluminescent material to pass through the reflective layer.

Preferably the layer of reflective material is made from micro-prism reflective material.

Preferably the reflective layer is attached to the photoluminescent layer, using high frequency welding. Preferably the layers are welded together using a lattice work grid pattern. This pattern of welding may prevent the egress of dirt or water into cells created by the welding pattern. The presence of such dirt or water in the cells may prevent the photoluminescent material from working.

Embodiments of the invention will now be described by way of example only, with reference to the accompanying drawings of which:

Figure 1:
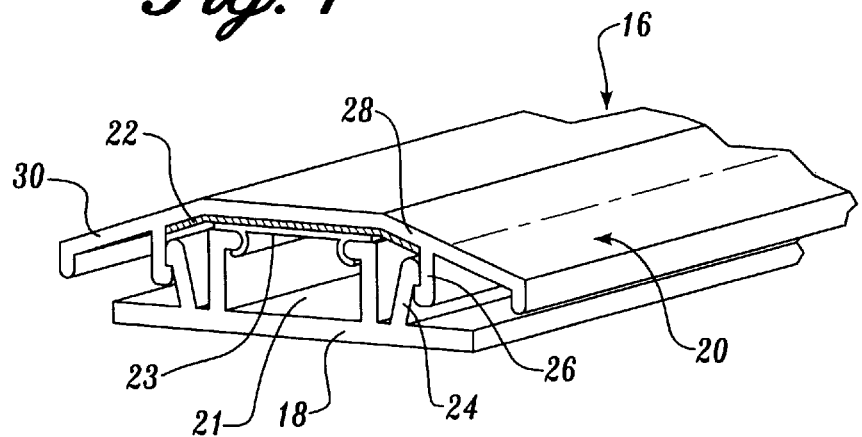
FIG. 1 shows a perspective view of a retro-fitted aircraft emergency exit floor path lighting track using existing track.
Figure 2:
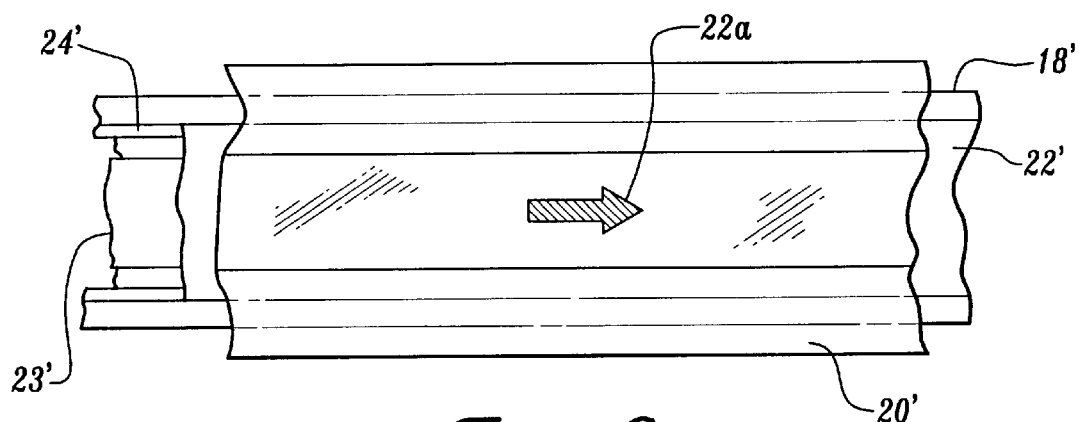
FIG. 2 shows a plan view of an original equipment aircraft exit floor path lighting track.
Figure 3:
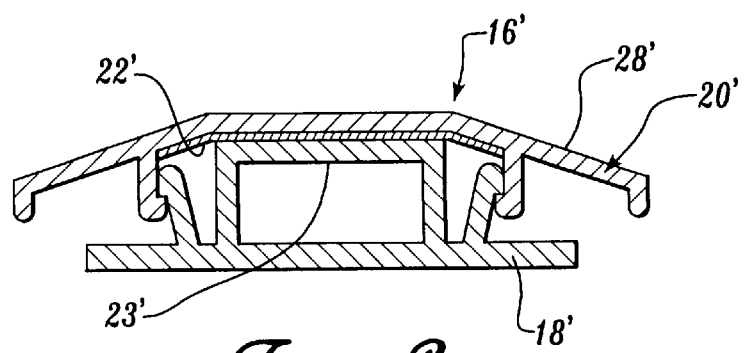
FIG. 3 is a cross-section of the track of FIG. 2.
Figure 4:
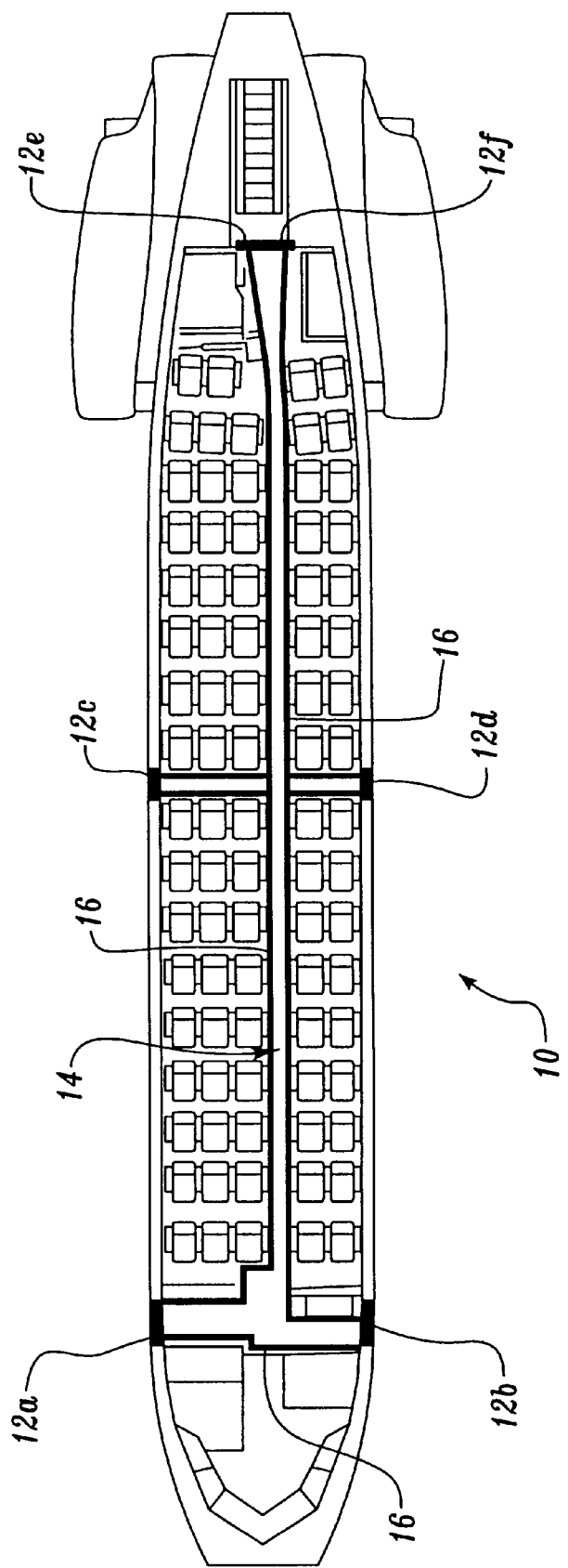
FIG. 4 shows the general arrangement of an emergency exit floor path lighting track in an aircraft.

A general view of a system in accordance with the invention is given in FIG. 4. This shows an aircraft 10 having emergency exits 12a, 12b, 12c, 12d, 12e, and 12f, and a floor mounted emergency exit pathway indicating system 14. The system 14 comprises a track 16 having a base member 18, a cover 20, and a photoluminescent strip 22 held between the cover and the base member. FIGS. 1 to 3 show this best. FIG. 4 shows that there are two tracks 16 associated with the aisle, and with each emergency exit route: one to either side of the floor path.

Referring to FIG. 1, this shows a molded plastics guide track 16 that has been retro-fitted to an aircraft that originally had an electric emergency floor path lighting system. The original plastics material base section 18 is retained. In an electrical lighting system wires and lights are retained in a channel 21, but in the retro-fitted photoluminescent system they have been removed and the top of the channel 21 has been closed by a plastics material support formation 23 which is releasably snap-fitted to hook formations at the top of the side walls of the channel 21. The photoluminescent strip 22 is a flexible strip of about a millimetre thick. It has a vinyl base which contains titanium dioxide or other whitening agent and has two thin-film layers of photoluminescent material-containing vinyl cast on top of the vinyl base. The photoluminescent material is overlaid by a UV protective top layer (not shown). The strip 22 has the following glow properties:

| Typical Glow Duration: | Initial | 1300 mcd/m$^2$ |
|---|---|---|
| | 1 minute | 445 mcd/m$^2$ |
| | 10 mins | 30 mcd/m$^2$ |
| | 30 mins | 8 mcd/m$^2$ |
| | 60 mins | 3.8 mcd/m$^2$ |

The photoluminescent material emits a yellow light, tinged with green.

In a different embodiment a whitening agent other than titanium dioxide may be used.

The cover 20 is made of a transparent plastics material. The cover 20 releasably clips on to the base section via co-operating fingers 24 and 26 provided on the base section and cover respectively. The cover has ramped, or sloping portions 28 and 30 which make it easier to roll a trolley over the track, and reduce the chance of someone tripping over the track.

FIGS. 2 and 3 show a track that is similar to that of FIG. 1 except that instead of being retro-fitted to an existing electrical track it is original equipment. Instead of having a separate support formation 21, the plastics material base section 18 of the embodiment of FIGS. 2 and 3 has a box-section support formation 21 integrally molded with it.

In a different embodiment the track of FIGS. 2 and 3 may be retro-fitted.

In both of the arrangements of FIG. 1 and FIGS. 2 and 3 the support formation supports the centre of the cover 20, and the strip 22, so that they do not collapse when someone treads on them.

Figure 5:
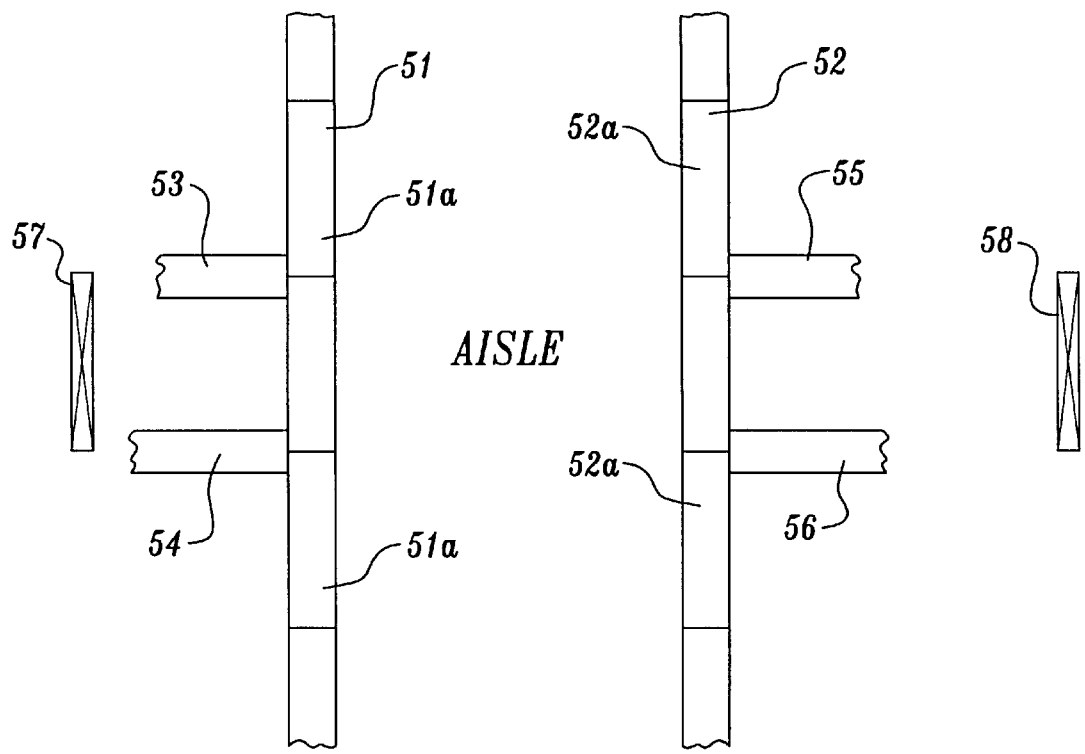
FIG. 5 shows detail of the track arrangement near an emergency exit.

FIG. 5 shows detail of the tracks 16 at the region of an emergency exit. The tracks referenced 51,52, are the main aisle tracks extending longitudinally of the aircraft. Branch tracks 53,54,55,56, extend, in pairs, to each emergency door, referenced as 57 and 58. This gives the passengers a lead right up to the emergency exit. It will also be noted from FIG. 4 that all of the aisles of the aircraft are bounded by photoluminescent track 16. This means that if a passenger follows a track 16 in any direction he will come to an emergency exit.

We may put arrows 22a, or other indicia, in the track to indicate the direction to the nearest emergency exit. We may also put words in the track, for example "Emergency Exit".

It we do put markings on the photoluminescent tracks we prefer to make them with the dye POLYVIN MATT FLUORESCENT RED PM 1256 or an equivalent colorant that also glows with light of its own color in the dark.

Figure 6:
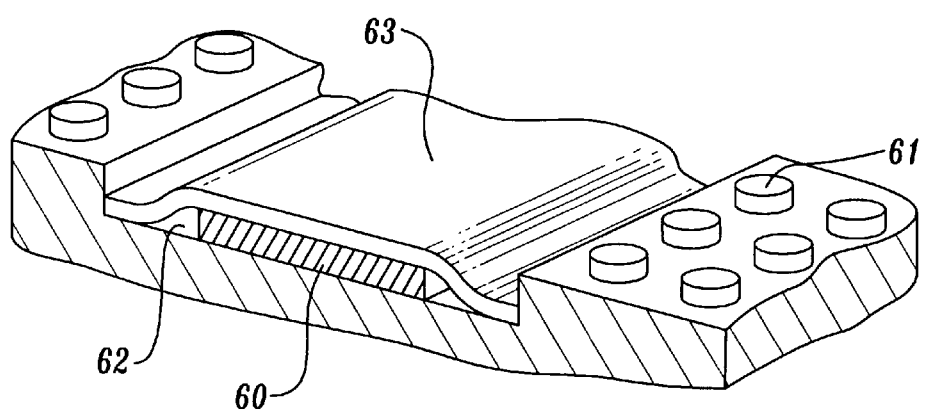
FIG. 6 shows detail of a track near a galley.

FIG. 6 shows another arrangement for installing a photoluminescent strip, referenced 60, in the flooring of an aircraft. The flooring is a non-slip plastics material flooring that has raised sections 61. These make it difficult to mount a strip to the flooring. We remove a channel of flooring, for example by abrading, or milling, possibly in situo in the aircraft, to produce a flat based channel 62. The strip 60 is laid in the channel and a transparent covering 63, for example an acetate strip, is glued over the photoluminescent strip 60. The channel 62 is wider than the strip 60 to give a surface area to which the cover 63 can be glued. The glue is also preferably transparent. In the embodiment shown in FIG. 6 the surface of the transparent cover strip 63 that overlays the photoluminescent strip 60 is at about the same height as the raised sections 61.

In a different embodiment the cover 63 may be of polycarbonate.

In a further embodiment the photoluminescent strip may be precut and vacuum sealed between two covering strips. A self adhesive may be applied to the bottom surface of one of the covering strips so that the complete assembly can be easily laid into a channel corresponding to channel 62 in the flooring of the aircraft.

Figure 7:
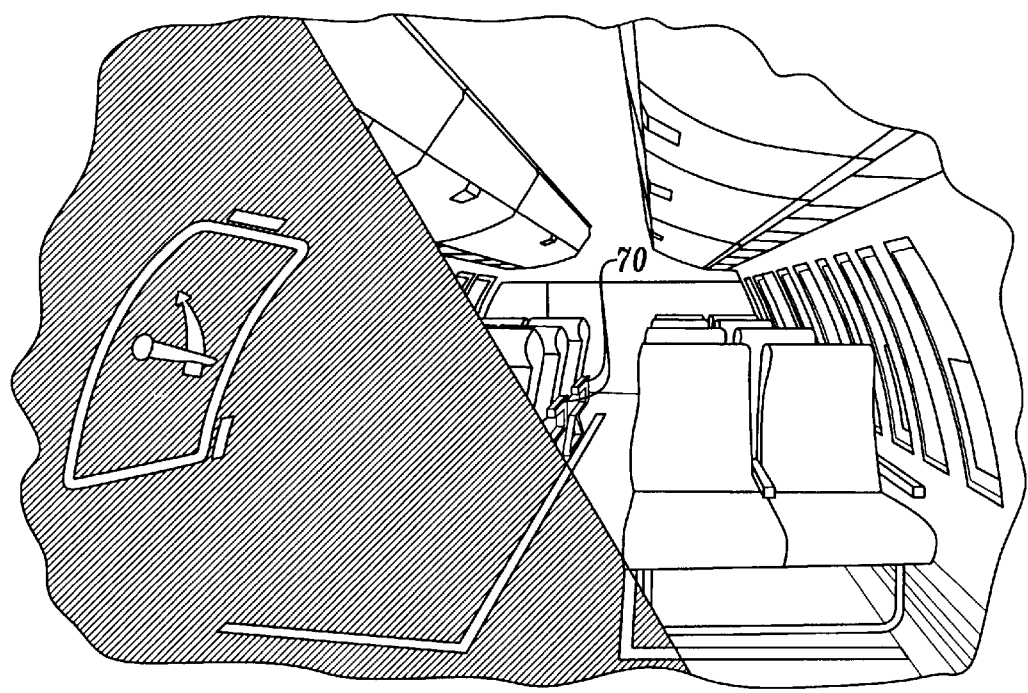
FIG. 7 shows an impression of what an aircraft emergency exit floor path system according to the invention will look like in use.

FIG. 7 has a right hand portion showing the interior of an aircraft and floor-mounted photoluminescent guide tracks, with the lights of the aircraft on, and a left hand portion showing what a passenger would see with the lights off. A clear path between the parallel photoluminescent tracks of the aisle, and the emergency exit gangways, is defined, and illuminated, for the passenger to escape. The photoluminescence of the pair of tracks is bright enough, at floor level, for reading.

Figure 8:
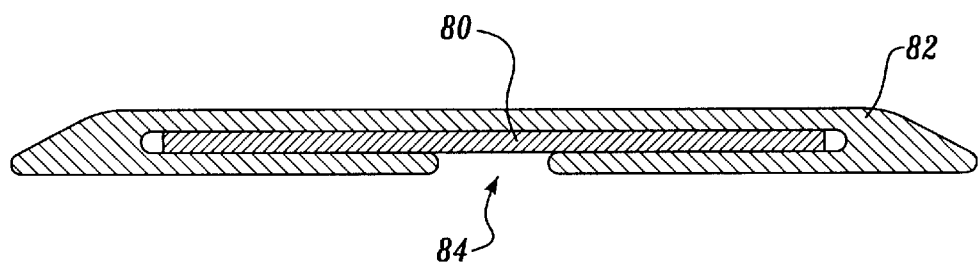
FIG. 8 is a cross section of a further embodiment of the lighting track.

FIG. 8 shows a further embodiment for mounting the photoluminescent strip 80. The housing 82 is low profile, presenting a minimum obstruction for trolleys and the like. The housing 82 has the dimensions: height 3.0 mm, and width 43 mm.

The strip 80 is removable from the housing 82. The gap 84 in the lower portion of the housing 82 facilitating the removal of the strip 80.

Some detailed features of possible alternative systems which are not shown in the drawings and/or described in detail above are:

A method of joining tracking together is preferred not to be, continuous runs of strip. This is preferably not used because a) it is unwieldy, and b) on impact it may drag away from the fuselage.

Instead we prefer to use short runs. We use 2 m lengths 51a and 52a (see FIG. 2) placed butt to butt, with the top cover of one slightly overlapping the base section of the next. We could seal using a small strip clip over the joint of the adjacent butting sections, but at present we do not find it necessary.

We have developed and do intend to use end-caps. These are placed at the beginning and end of track runs. We could use the end caps between the 2 meter runs, but this would break the concept of continuous cuing. This may be acceptable.

For right-angle joins as in cross-aisle, we just put the track against each other. Proper mitring of the joint into right-angles or T-junctions could be performed if appropriate.

One way of attaching the lighting strips to the aircraft floor is to ultrasonically weld the PLM tracking into carpeting. The results of our secret tests so far have been successful. This invention would include welding in the strips as they are shown in the drawings, and alternatively welding strips covered or sealed in poly carbonate or other protective see-through material. Instead of welding we may prefer to glue or otherwise inserting or attaching photoluminescent material to the floor covering.

Another variation of this theme is that we may "black" (make opaque) the flange or edge performs of the otherwise transparent top cover to cover up poor cutting of the carpet/floor covering. Furthermore, changing the color of the light given off by either coloring the top cover by inserting pigment into the plastic mix or by inserting a colored filter member between the PLM and the top cover or by putting the pigment or filter in the UV protective layer or below the UV protective layer of the PLM is possible.

As discussed in the introduction, we have developed yet another concept for the utilization of the floor mounted emergency exit path strips. A major cost in putting in lighting strips is the cost and wastage associated with cutting up the aircraft carpet/floor covering. This means that the carpet is thrown away each time there is a change of layout. Consequently we have invented the idea of a system which does not require the carpet to be cut. A backing plate is secured to the floor of the cabin where the tracking is required to run. This plate either has locator holes or studs, it can work either way, along its length. The carpet is laid on top of it and the photoluminescent tracking (it will have to be a lower profile than the present one) is married up and pressed home attaching to the backing plate. Although the attachment could work male to female, or female to male, we feel that the studs should be on the back plate as it would be far easier to locate.

This concept of a backing member beneath the carpet to which floor path lighting is secured, through the carpet that is between them, also applies to standard electrical floor lighting.

In addition we feel that as an alternative we may provide a quick release/no damage to the carpet system. This might include some sort of velcro concept for surface mount, or additionally or alternatively clamps for the lighting system secured at regular intervals on the cabin floor. The clamps might be cut into the carpet, and when PLM is used would secure the PLM strip.

We have also invented a method of combining reflective material with PLM vinyl such that the PLM beneath absorbs light through the surface mounted reflective material whilst shining through the reflective material to give off light. This combination is a great break through as it is unique to be both reflective as well as PLM charged. Its uses will be for high visibility clothing, life boats, lift belts, and for signs in general. It will also be useful on way guidance in buildings as well as vehicles such as cars and lorries.

It will be appreciated that we could mount the photoluminescent safety strips 70 on the seats (eg the sides of the seats, with or without breaks in the PL material). We could mount the strips on the legs of the seats. Seat side mounting has the advantage that we do not have to cut the carpet to install the system, or to recognise the layout of the P1 safety strips within the aircraft.

We could clip the strips to the seat/or carpet, use studs (or releasable mechanical fasteners) use hook and fibre fasteners (velcro™). We could weld the strips to the carpet and/or seat sides. We could glue the strips down.

I claim:

1. An aircraft comprising:
    (a) an emergency exit door;
    (b) an aisle along a floor of the aircraft leading to said door between a first group of seats disposed along one side of said aisle and a second group of seats disposed along the other side of said aisle;
    (c) an emergency exit guidance system including:
        (i) a first elongate guide strip fastened to said aisle floor; and
        (ii) a second elongate guide strip fastened to said aisle floor;
    (d) said first and second elongate guide strips each including
        a plurality of sections placed longitudinally in sequence, extending end to end along each of the first and the second guide strips, each section comprising a base support section,
        a photoluminescent light-emitting guide section, and one of a transparent and a translucent cover section;
    (e) wherein the cover section of each of said sections has, in an elongate direction of the guide strip, an unstepped generally flat, smooth top surface that extends the length of the section; and
    (f) wherein each of said photoluminescent light-emitting guide sections of each of said sections has an upper surface formed as an elongate ribbon having a substantial elongate length in a longitudinal direction of said section and a substantial width in a direction transverse to the longitudinal direction, said photoluminescent guide sections emitting light over substantially their entire upper surface, producing a substantially continuous strip of light, so that said first and second elongate guide strips clearly indicate the sides of the aisle leading to the emergency exit door.

2. The aircraft according to claim 1, wherein each guide strip has a top surface area; and wherein the light-emitting upper surface of said photoluminescent guide occupies substantially the entire top surface area of said guide strip.

3. The aircraft according to claim 1, wherein said light-emitting upper surfaces of said first and second guide strips extend for substantially the entire length of said guide strips.

4. The aircraft according to claim 1, wherein said cover section is releasably secured to said base support section such that said cover section may be removed from said base support section and readily replaced.

5. The aircraft according to claim 1, wherein said cover section has an upper surface that slopes towards opposite edges of said cover section so that wheeled vehicles may easily pass over the cover section.

6. The aircraft according to claim 1, wherein said photoluminescent light-emitting guide section is an elongate strip with generally parallel sides, said photoluminescent light-emitting guide section producing a substantially continuous track of light.

7. The aircraft according to claim 1, wherein an ultraviolet impermeable layer is provided to at least partially protect the photoluminescent light-emitting guide sections from damaging exposure to ultraviolet light.

8. The aircraft according to claim 1, wherein said photoluminescent light-emitting guide section emits photoluminescent light of a first color, further comprising a marking that overlies a region encompassing at least part of the upper surface of said photoluminescent light-emitting guide section, said marking being of a second color that is different than the first color and comprising a substance that changes the color of photoluminescent light emanating from the region so as to emit light of the second color.

9. The aircraft according to claim 1, further comprising a coloring disposed over said photoluminescent light-emitting guide section, said coloring being translucent to photoluminescent light emitted by said photoluminescent light-emitting guide section so that at least a portion of light emitted thereby is transmitted through said coloring, changing a wavelength spectrum of at least said portion of the light, said changed wavelength spectrum causing at least said portion to be a different color than the photoluminescent light emitted by the photoluminescent light-emitting guide section.

10. The aircraft according to claim 1, in which each of the plurality of sections comprising said first and the second guide strips includes a reflective layer disposed adjacent to the photoluminescent light-emitting guide section.

11. The aircraft according to claim 1, wherein said cover section extends laterally beyond a plan projection of said base support section.

12. The aircraft according to claim 1, wherein a colored filter is introduced between said cover section and said photoluminescent light-emitting guide section, said colored filter changing the color of the light originally emitted by said photoluminescent light-emitting guide section.

13. The aircraft according to claim 1, wherein a pair of spaced-apart branch tracks extend from said first guide strip to said emergency door, each of said branch tracks comprising an elongate base support section fastened to the floor of the aircraft, a photoluminescent light-emitting guide section supported by said base support section, and one of a transparent and a translucent cover section covering said photoluminescent light-emitting guide section.

14. The aircraft according to claim 1 wherein said cover sections are removably mounted on said base support sections.

15. The aircraft according to claim 1, wherein said photoluminescent light-emitting guide section has photoluminescent decay properties such that when charged to an extent sufficient to generate an initial light output of 1300 mcd/m$^2$ in an absence of incident light impinging on the photoluminescent light-emitting guide section, the light output of the photoluminescent light-emitting guide section is at least 445 mcd/m$^2$ after one minute, at least 30 mcd/m$^2$ after ten minutes, and at least 8 mcd/m$^2$ after thirty minutes.

16. The aircraft according to claim 1, further comprising elongate photoluminescent guide strips disposed on seats adjacent said aisle.

17. The aircraft according to claim 1, wherein said first and second guide strips include an ultraviolet impermeable layer above said photoluminescent light-emitting guide section to protect said guide section from ultraviolet light.

18. The aircraft according to claim 1, wherein said photoluminescent light-emitting guide section emits light of a first color, further comprising a marking overlying said photoluminescent guide section, said marking being of a second color different than the first color and comprising a substance that changes the color of light emitted by the photoluminescent light-emitting guide section, so that light emanating from the marking is of the second color.

19. The aircraft according to claim 1, wherein said cover sections each have a flat top surface disposed between side surfaces that slope downwardly away from said flat top surface, to facilitate the passage of wheeled trolleys over the cover sections.

20. The aircraft according to claim 1, wherein said cover section includes a flat top surface and a generally vertical side wall, one side of which defines an edge of said flat top surface.

21. The aircraft of claim 1, wherein at least a portion of said photoluminescent light-emitting guide sections are nondirectional and do not indicate a preferred direction of travel relative to emergency exit door.

22. An aircraft comprising:
(a) an emergency exit door;
(b) an aisle on a floor of the aircraft leading to said exit door between a first group of seats to one side of said aisle and a second group of seats on the other side of said aisle;
(c) an emergency exit guidance system including:
  (i) a first elongate guide strip fastened to said floor along the aisle adjacent said first group of seats; and
  (ii) a second elongate guide strip fastened to said floor along the aisle adjacent said second group of seats, generally parallel to and spaced apart from said first elongate guide strip, thereby defining an exit path to said emergency exit door;
(d) said first and second guide strips each comprising:
  (i) an elongate base support member having a central section with a flat support surface that is elongate, extending along the length of the guide strip;
  (ii) an elongate photoluminescent light-emitting guide extending substantially the length of the guide strip and supported by said flat support surface, said photoluminescent light-emitting guide having a substantially flat, smooth top surface; and
  (iii) a plastic cover having a smooth, flat undersurface where it covers said photoluminescent light-emitting guide, said plastic cover transmitting light emitted by the photoluminescent light-emitting guide, said plastic cover extending outwardly beyond the photoluminescent light-emitting guide and being adapted to rest upon the floor of the aircraft, said plastic cover being removably coupled to said elongate base support member; and
(e) said first and second elongate guide strips, with said respective photoluminescent light-emitting guides forming substantially continuous ribbons of light bounding said aisle along the floor and leading to said emergency exit door.

23. The aircraft of claim 22, wherein the central section is generally box-shaped, having two generally parallel side walls, atop which is disposed the flat support surface, extending between top edges of the side walls, said base support section further having two elongate clips disposed outward of the central section and extending adjacent the side walls of the central section, said plastic cover having two elongate flanges extending downwardly from an under surface of the plastic cover, said elongate flanges removably coupling with said elongate clips to attach the plastic cover to said elongate base support member.

24. An aircraft comprising:
(a) an aircraft passenger cabin provided with an emergency exit door;
(b) an aisle floor leading between a first row of seats at one side of said aisle floor and a second row of seats at the other side of said aisle floor;
(c) an emergency exit guidance system comprising:
  (i) an elongate guide strip fastened to said aisle floor, said elongate guide strip extending substantially continuously from a passenger holding area of said aircraft passenger cabin to said emergency exit door and comprising:
    (1) an extruded elongate base strip fastened to said aisle floor, said base strip having a generally flat central support and elongate flanges disposed on opposite sides of the central support;
    (2) an elongate photoluminescent layer formed as a ribbon strip overlying said base strip and supported by an upper, generally planar surface of said central support; and
    (3) a cover strip that transmits light, overlying said photoluminescent layer and removably coupled to the elongate flanges, said cover strip protecting the photoluminescent layer, said cover strip being sufficiently supported by the central support, such that a passenger can tread on the cover strip without damaging the photoluminescent layer; and
(d) wherein said removable coupling of said cover strip to said base strip enables said cover strip to be removed while said base strip is still attached to said aisle floor.

25. The aircraft according to claim 24, wherein photoluminescent guide strips are provided on seats disposed adjacent said aisle floor.

26. An aircraft comprising:
(a) an aircraft passenger cabin having an emergency exit door;
(b) an aisle floor leading between a first row of seats at one side of said aisle floor and a second row of seats at the other side of said aisle floor;
(c) an emergency exit guidance system comprising an elongate guide strip fastened to said aisle floor, said elongate guide strip extending substantially continuously from a passenger holding area of said aircraft passenger cabin to said emergency exit door and comprising:
  (i) an elongate base strip fastened to said aisle floor;
  (ii) an elongate photoluminescent layer overlying said base strip and supported by said base strip; and
  (iii) a light-transmissive cover formed of a plastic overlying said photoluminescent layer, a configuration of said base strip, said photoluminescent layer, and said cover enabling a passenger to tread on the cover without damaging the photoluminescent layer;
(d) wherein said guide strip comprises a plurality of sections, including:
  (i) a plurality of base strip sections laid end to end;
  (ii) a plurality of cover sections laid end to end; and
  (iii) a plurality of photoluminescent layer sections extending in a line;
(e) wherein said base strip comprises a channel having side walls that contact and support the cover, and flanges that releasably engage the cover, the photoluminescent layer being held between the cover and said base strip; and
(f) wherein the guide strip has a substantial longitudinal length and a substantial transverse width, said photoluminescent layer occupying substantially the whole longitudinal length of said guide strip, emitting light substantially continuously along the whole longitudinal length of said guide strip, and extending transversely between said flanges that releasably engage the cover, across a transverse width of said guide strip.

27. An aircraft having an aisle extending longitudinally adjacent a plurality of seats, comprising:
(a) an elongate photoluminescent strip having a width, a thickness, and a length, said photoluminescent strip extending longitudinally and continually along the aisle of the aircraft, emitting visible light without being energized by an electrical current, and having a upper surface that is generally flat, continuously, along the length of the elongate photoluminescent strip; and
(b) a light-transmissive plastic material extending continuously over the elongate photoluminescent strip to protect it, said light-transmissive plastic material and said elongate photoluminescent strip forming an integral guide strip having a continuous flat, smooth top surface in the longitudinally extending direction of the elongate photoluminescent strip, an interface between a top of the elongate photoluminescent strip and light-transmissive material also being flat and smooth, said elongate photoluminescent strip emitting light in a continuous track along the aisle of the aircraft.

28. The aircraft of claim 27, further including another integral guide strip extending along the aisle of the aircraft to provide substantially parallel continuous tracks of light that define a path along the aisle of the aircraft.

29. The aircraft of claim 27, wherein the light-transmissive plastic material substantially encapsulates the elongate photoluminescent strip and is attached to the aircraft to secure said integral guide strip in place along the aisle.

* * * * *

US005961072C1

(12) EX PARTE REEXAMINATION CERTIFICATE (6312th)
United States Patent (10) Number: US 5,961,072 C1
Bodle (45) Certificate Issued: Jul. 22, 2008

(54) EMERGENCY LIGHTING

(75) Inventor: Peter Winstanley Bodle, Norfolk (GB)

(73) Assignee: Saf-T-Glo Limited, Narboroug, Norfolk (GB)

Reexamination Request:
No. 90/005,937, Feb. 22, 2001

Reexamination Certificate for:
Patent No.: 5,961,072
Issued: Oct. 5, 1999
Appl. No.: 08/519,426
Filed: Aug. 25, 1995

(30) Foreign Application Priority Data

Apr. 20, 1995 (GB) .............................. 9508065

(51) Int. Cl.
| B64D 25/00 | (2006.01) |
| A62B 3/00 | (2006.01) |
| G09F 13/20 | (2006.01) |
| G09F 19/22 | (2006.01) |
| B60Q 3/00 | (2006.01) |
| B60Q 3/02 | (2006.01) |

(52) U.S. Cl. .................. 244/118.5; 40/542; 40/570; 362/84; 362/163

(58) Field of Classification Search ................ None
See application file for complete search history.

(56) References Cited

U.S. PATENT DOCUMENTS

| 3,591,942 | A | * | 7/1971 | Van Swearingen | ........ 40/542 X |
| 4,029,994 | A | | 6/1977 | Iwans | |
| 4,208,300 | A | | 6/1980 | Gravisse | |
| 4,286,164 | A | | 8/1981 | Ragland | |
| 4,401,050 | A | | 8/1983 | Britt et al. | |
| 4,806,772 | A | | 2/1989 | Lindmayer | |
| 4,998,391 | A | * | 3/1991 | Connew | ........ 52/179 |
| 5,045,981 | A | | 9/1991 | Nagano | |
| 5,108,836 | A | | 4/1992 | Ocampo et al. | |
| 5,270,100 | A | * | 12/1993 | Giglio | ........ 40/542 X |
| 5,300,783 | A | | 4/1994 | Spencer et al. | |
| 5,411,784 | A | * | 5/1995 | Brewster | ........ 40/594 X |
| 5,499,170 | A | * | 3/1996 | Gagne | ........ 362/84 |

FOREIGN PATENT DOCUMENTS

WO WO87/02813 5/1987

OTHER PUBLICATIONS

Intrad Permalight publication, Sep. 1989.*
"New Developments in Escape and Safety." *Intrad News* 13, Special Issue, (England). n.d.: 6 pp.
G.M.B. Webber et al., "Emergency Wayfinding Lighting Systems", Building Research Establishment Information Paper, Jan. 1993.
G.M.B. Webber et al., "Photoluminescence for Aiding Escape", Fire Surveyor, vol. 17, No. 6, pp. 17–27, Dec. 1988.
G.M.B. Webber et al., "Photoluminescent Markings for Escape Routes", Building Research Establishment Information Paper, Sep. 1989.
Triex Group International, Inc., Advertising Flyer for "Non–Electric/Non–Radioactive Photoluminescent Safety Tapes", © 1993.
M. Teal et al., "Improved Interior Emergency Lighting Study", Final Report prepared by Douglas Aircraft Company, of McDonnell Douglas Corporation, under Contract No. DTFA 03–82–C00055 sponsored by Department of Transportation, Federal Aviation Administration Technical Center, Atlantic City Airport, New Jersey, available to the public through National Technical Information Service, Springfield, Virginia 22161 (ADA134525, 1983).

(Continued)

*Primary Examiner*—Beverly M. Flanagan

(57) ABSTRACT

An emergency lighting system for an aircraft has photoluminescent strips mounted on the floor rather than a string of electrical lights. This is a better fail-safe since there is no possibility of failure in power supply. A channel extrusion is secured to the floor of the aircraft and a photoluminescent strip is held between the channel and a transparent cover member. The photoluminescent strip has two thin layers of photoluminescent material rather on a base layer, rather than being a calendered product. This increases the light output.

OTHER PUBLICATIONS

Advertising flyer for Atkins & Merrill, Inc. for "Aisle Outline," published prior to Feb. 1979.

U.S. Department of Transportation, Federal Aviation Administration Supplemental Type Certificate No. SA1008GL, issued to Midland–Ross Corporation, Grimes Division (550 State Route 55, P.O. Box 247, Urbana, Ohio 43078) on Mar. 28, 1986 for "Grimes Floor Proximity Lighting System".

Robert C. Ballew, A Picture of *Floor Proximity Emergency Escape Path Marking System Design*, for which Supplemental Type Certificate No. SA3614SW was issued on Apr. 8, 1986 by Federal Aviation Administration, Department of Transportation.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3–5, 7, 9–18, 22, 23 and 26 are cancelled.

Claim 2, 6, 8, 19–21, 24 and 27 are determined to be patentable as amended.

Claims 25, 28 and 29, dependent on an amended claim, are determined to be patentable.

New claim 30 is added and determined to be patentable.

2. The aircraft according to claim [1] *24*, wherein [each] *the elongate* guide strip has a top surface area; and wherein [the] *a* light-emitting upper surface of said *elongate* photoluminescent [guide] *layer* occupies substantially the entire top surface area of said *elongate* guide strip.

6. The aircraft according to claim [1] *24*, wherein said [photoluminescent light-emitting] *elongate* guide [section is an elongate] strip [with] *has* generally parallel sides, said *elongate* photoluminescent [light-emitting guide section] *layer* producing a substantially continuous track of light.

8. The aircraft according to claim [1] *24*, wherein said *elongate* photoluminescent [light-emitting guide section] *layer* emits photoluminescent light of a first color, further comprising a marking that overlies a region encompassing at least part of [the] *an* upper surface of said photoluminescent [light-emitting guide section] *layer*, said marking being of a second color that is different than the first color and comprising a substance that changes the color of photoluminescent light emanating from the region so as to emit light of the second color.

19. The aircraft according to claim [1] *24*, wherein said cover [sections each have] *strip has* a flat top surface disposed between side surfaces that slope downwardly away from said flat top surface, to facilitate the passage of wheeled trolleys over the cover [sections] *strip*.

20. The aircraft according to claim [1] *24*, wherein said cover [section] *strip* includes a flat top surface and a generally vertical side wall, one side of which defines an edge of said flat top surface.

21. The aircraft according to claim [1] *24*, wherein at least a portion of said *elongate* photoluminescent [light-emitting guides sections are] *layer is* non-directional and [do] *does* not indicate a preferred direction of travel to *the* emergency exit door.

24. An aircraft comprising:
(a) an aircraft passenger cabin provided with an emergency exit door;
(b) an aisle floor leading between a first row of seats at one side of said aisle floor and a second row of seats at the other side of said aisle floor;
(c) an emergency exit guidance system comprising:
  (i) an elongate guide strip fastened to said aisle floor, said elongate guide strip extending substantially continuously from a passenger holding area of said aircraft passenger cabin to said emergency exit door and comprising:
    (1) an extruded elongate base strip fastened to said aisle floor, said base strip having a generally flat central support and *first and second* elongate flanges disposed on *said base, extending generally upwardly on* opposite sides of the central support;
    (2) an elongate photoluminescent layer formed as a ribbon strip overlying said base strip and supported by an upper, generally planar surface of said central support, *said elongate photoluminescent layer extending transversely across the elongate guide strip, substantially from the first elongate flange on one side of the central support to the second elongate flange on the opposite side of the central support*; and
    (3) a cover strip that transmits light, overlying said photoluminescent layer *in close proximity thereto* and removably coupled to the elongate flanges, said cover strip protecting the photoluminescent layer, said cover strip being sufficiently supported by the central support, such that a passenger can tread on the cover strip without damaging the photoluminescent layer, *said cover strip being continuous across a latitudinal dimension, such that when the cover strip engages said elongate flanges, no joints are formed in an upper surface of said elongate strip*; and
(d) wherein said removable coupling of said cover strip to said base strip enables said cover strip to be removed while said base strip is still attached to said aisle floor.

27. An aircraft having an aisle extending longitudinally adjacent a plurality of seats, comprising:
(a) an elongate photoluminescent strip having a width, a thickness, and a length, said photoluminescent strip extending longitudinally and continually along the aisle of the aircraft, emitting visible light without being energized by an electrical current, and having an upper surface that is generally flat, continuously, along the length of the elongate photoluminescent strip; and
(b) a light-transmissive plastic material extending continuously over the elongate photoluminescent strip to protect it *and having opposed side portions that locate and retain said photoluminescent strip*, said light-transmissive plastic material and said elongate photoluminescent strip forming an integral guide strip having a continuous flat, smooth top surface in the longitudinally extending direction of the elongate photoluminescent strip, an interface between a top of the elongate photoluminescent strip and light-transmissive material also being flat and smooth, said elongate photoluminescent strip emitting light in a continuous track along the aisle of the aircraft.

*30. The aircraft according to claim 24, wherein the elongate guide strip extends along one side of said aisle floor, further comprising another elongate guide strip that is disposed along an opposite side of the aisle floor from said elongate guide strip and generally identical thereto.*

* * * * *